United States Patent
Deymier et al.

(10) Patent No.: US 11,301,599 B2
(45) Date of Patent: Apr. 12, 2022

(54) SYSTEMS AND METHODS FOR THE TUNABILITY OF PHASE IN QUANTUM-LIKE MECHANICAL ELASTIC SYSTEMS

(71) Applicant: Arizona Board of Regents on Behalf of the University of Arizona, Tucson, AZ (US)

(72) Inventors: Pierre A. Deymier, Tucson, AZ (US); Keith A. Runge, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 696 days.

(21) Appl. No.: 16/320,284

(22) PCT Filed: Jul. 26, 2017

(86) PCT No.: PCT/US2017/044019
§ 371 (c)(1),
(2) Date: Jan. 24, 2019

(87) PCT Pub. No.: WO2018/022796
PCT Pub. Date: Feb. 1, 2018

(65) Prior Publication Data
US 2019/0266298 A1    Aug. 29, 2019

Related U.S. Application Data

(60) Provisional application No. 62/367,048, filed on Jul. 26, 2016.

(51) Int. Cl.
*G06F 30/20* (2020.01)
*B82Y 10/00* (2011.01)
*B82Y 30/00* (2011.01)
*B82Y 40/00* (2011.01)
*G06F 111/10* (2020.01)

(52) U.S. Cl.
CPC .............. *G06F 30/20* (2020.01); *B82Y 10/00* (2013.01); *B82Y 30/00* (2013.01); *B82Y 40/00* (2013.01); *G06F 2111/10* (2020.01)

(58) Field of Classification Search
None
See application file for complete search history.

(56) References Cited

U.S. PATENT DOCUMENTS 8,525,544 B2    9/2013    Wu et al.

OTHER PUBLICATIONS

Hoogstraten, et al., Propagation of sound waves in a moving medium, J. Engr. Mathematics 1971, 5, 295-305.
Hu, et al., Localization of ultrasound in a three-dimensional elastic network, Nat. Phys. 2008, 4, 945.
Kane, et al., Topological boundary modes in isostatic lattices, Nat. Phys. 2013, 10, 39-45.
Khanikaev, et al., Photonic topological insulators, Nat. Mat. 2013, 12, 233.

(Continued)

*Primary Examiner* — Evren Seven
(74) *Attorney, Agent, or Firm* — Polsinelli PC

(57) ABSTRACT

Various embodiments for quantum-like mechanical elastic systems and related methods thereof including an approach for the tunability of a phase in quantum-like mechanical elastic systems are disclosed.

20 Claims, 2 Drawing Sheets

(56) References Cited

OTHER PUBLICATIONS

Khanikaev, et al., Topologically robust sound propagation in an angular-momentum-biased graphene-like resonator lattice, Nat. Comm. 2015, 6,8260.

Maxwell, A dynamical theory of the electromagnetic field, Phil. Trans. R. Soc. Lond. 1865, 155, 459.

Merkel, et al., Experimental Evidence of Rotational Elastic Waves in Granular Phononic Crystals, Phys. Rev. Lett., 2011, 107, 225502.

Mousavi, et al., Topologically protected elastic waves in phononic metamaterials, Nat. Comm. 2015,6, 8682.

Nash, et al., Topological mechanics of gyroscopic metamaterials. 2015, ArXiv150403362 Cond-Mat.

Paulose, et al., Selective buckling via states of self-stress in topological metamaterials, Proc. Natl. Acad. Sci. 2015, 112, 7639.

Paulose, et al., Topological modes bound to dislocations in mechanical metamaterials, Nat. Phys. 2015, 11, 153-156.

International Search Report and Written Opinion issued in Application No. PCT/US2017-044019, dated Oct. 30, 2017, 13 pages.

Aharonov, Significance of electromagnetic potentials in the quantum theory, Phys.Rev. 1959, 115, 485.

Berg, et al., Topological phonon modes in filamentary structures, Phys. Rev. E 2011, 83, 021913.

Berry, Quantal Phase Factors Accompanying Adiabatic Changes, Proc. Roy. Soc. A 1984, 392, 45-57.

Bilic, Relativistic acoustics geometry, Class. Quantum Gray.1999, 16, 3953-3964.

Chen, et al., Nonlinear conduction via solitons in a topological mechanical insulator, Proc. Natl. Acad. Sci. 2014, 111,13004-13009.

Deymier, et al., Phononic Structures Supporting Elastic Waves with Non-conventional Topology, Crystals 2016, 6, x; doi:10.3390/.

Deymier, et al., One-Dimensional Mass-Spring Chains Supporting Elastic Waves with Non-conventional Topology, Crystals 2016, 6, 44, Apr. 16, 2016. [online] <URL: http://www.mdpi.com/273-4352/6/4/44/htm>.

Deymier, et al., Rotational modes in a phononic crystal with fermion-like behaviour, J. Appl. Phys. 2014, 115, 163510.

Deymier, et al., Torsional topology and fermion-like behavior of elastic waves in phononic structures, Comptes Rendus de l'Academie des Sciences—Micanique 2015, 343, 700-711.

Fleury, et al., Floquet Topological Insulators for Sound, 2015, arXiv: 1511.08427.

Fleury, et al., Sound isolation and giant linear nonreciprocity in a compact acoustic circulator, Science 2014, 343, 516.

Forbes, et al., The acoustical Klein-Gordon equation: the wave-mechanical step and barrier potential functions, J. Acoust. Soc. Am., 2003, 114, 1291-302.

Garcia de Andrade, Non-Riemannian geometry of vortex acoustics, Phys. Rev. D. 2004, 70, 064004.

Godin, An exact wave equation for sound in inhomogeneous, moving, and non-stationary fluids, Oceans 2011, 1-5.

Gupta, et al., Ultrafast manipulation of electron spin coherence, Science 2001, 292, 2458.

Haldane, et al., Possible realization of directional optical waveguides in photonic crystals with broken time-reversal symmetry, Phys. Rev. Lett. 2008, 100, 013904.

Hasan, et al., Colloquium: Topological insulators, Rev. Mod. Phys. 2010, 82, 3045.

Helleman, et al., On a nonlinear perturbation theory without secular terms: I. Classical coupled anharmonic oscillators, Physica 1974, 74, 22.

Prodan, et al., Topological Phonon Modes and Their Role in Dynamic Instability of Microtubules, Phys. Rev. Lett. 2009, 103, 248101.

Salerno, et al., Floquet topological system based on frequency-modulated classical coupled harmonic oscillators, 2015, arXiv: 1510.04697.

Stone, Acoustic energy and momentum in a moving medium, Phys. Rev. E 2000, 62, 1341.

Susstrunk, et al., Observation of phononic helical edge states in a mechanical topological insulator, Science 2015, 349, 47-50.

Swinteck, et al., Bulk elastic waves with unidirectional backscattering-immune topological states in a time-dependent superlattice, J. Appl. Phys. 2015, 118, 063103.

Thomas, et al., Predicting phonon dispersion relations and lifetimes from the spectral energy density, Phys. Rev. B 2010, 81, 091411.

Unruh, Experimental black-hole evaporation? Phys. Rev. Lett.1981, 46, 1351.

Van der Biest, et al., Resonant tunneling of acoustic waves through a double barrier consisting of two phononic crystals, Europhysics Lett. 2005, 71, 63.

Vasseur, et al., Absolute forbidden bands in two-dimensional phononic crystal plates, Phys. Rev. B, 2008, 77, 085415.

Visser, et al., Acoustic geometry for general relativistic barotropic irrotational fluid flow, New Journal of Physics 2010, 12, 095014.

Wang, et al., Acoustic asymmetric transmission based on time-dependent dynamical scattering, Nat. Scientific Reports 2015, 5, 10880.

Wang, et al., Topological Phononic Crystals with One-Way Elastic Edge Waves, Phys. Rev. Lett. 2015, 115, 104302.

Weaver, Localization of ultrasound, Wave Motion 1990, 12, 129-142.

Xiao, et al., Geometric phase and band inversion in periodic acoustic systems, Nat. Phys. 2015, 11, 240-244.

Yang, et al., Topological Acoustics, Phys. Rev. Lett. 2015, 114, 114301.

Yang, et al., Ultrasound tunneling through 3D phononic crystals, Phys. Rev. Lett. 2002, 88, 104301.

SYSTEMS AND METHODS FOR THE TUNABILITY OF PHASE IN QUANTUM-LIKE MECHANICAL ELASTIC SYSTEMS

FIELD

The present disclosure generally relates to quantum-like mechanical elastic systems and in particular to an approach for the tunability of a phase in quantum-like mechanical elastic systems.

BACKGROUND

There are two classes of phononic structures that can support elastic waves with non-conventional topology, namely intrinsic and extrinsic systems. The non-conventional topology of elastic wave results from breaking time reversal symmetry (T-symmetry) of wave propagation. In extrinsic systems, energy is injected into the phononic structure to break T-symmetry. In intrinsic systems, symmetry is broken through the medium microstructure that may lead to internal resonances.

Mechanical analogues of electromagnetic and quantum phenomena have a long history. For instance, Maxwell in his seminal paper "A dynamical theory of the electromagnetic field" sought an elastic model of electrical and magnetic phenomena and electromagnetic waves. Other mechanical models of physical phenomena abound, including quantum mechanical behavior. For instance, the localization of ultrasound waves in two-dimensional and three-dimensional disordered phononic media serves as mechanical analogues of Anderson localization of electrons. Tunneling of classical waves through phononic crystal barriers establishes a correspondence with its quantum counterpart.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
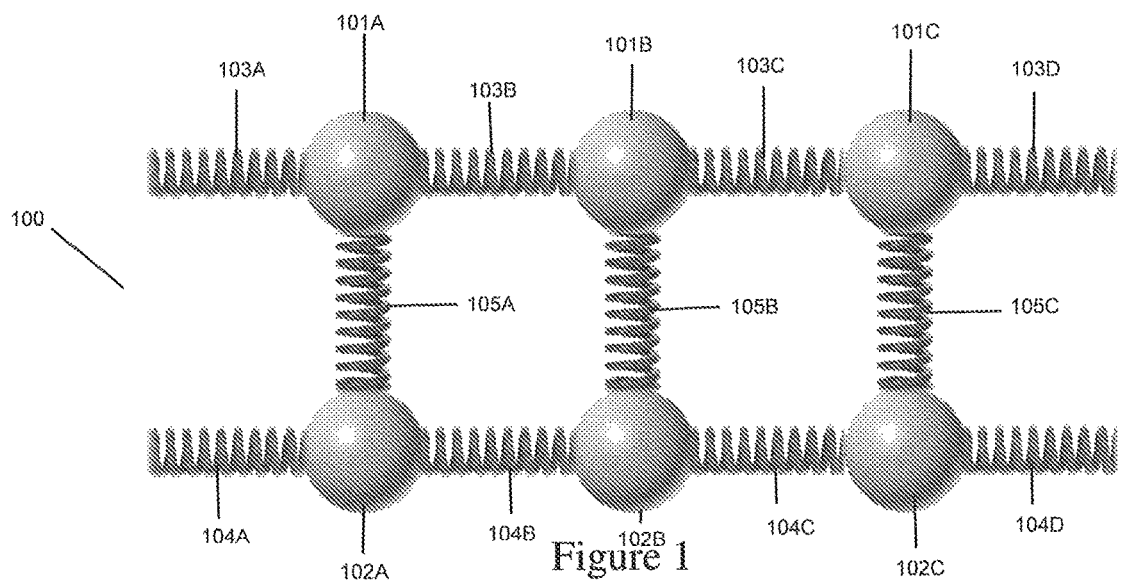
FIG. 1 depicts a schematic illustration of a system composed of two coupled one-dimensional harmonic crystals.

Mass-spring composite structures may be introduced as metaphors for more complex phononic crystals with non-conventional topology and also allowing for the exploration of a large parameter space of scalar Quantum Field Theory (QFT). The elastic wave equation of motion of an intrinsic phononic structure composed of two coupled one-dimensional (1D) harmonic chains can be factored into a Dirac-like equation, leading to antisymmetric modes that have spinor character therefore non-conventional topology in wave number space. The topology of the elastic waves can be further modified by subjecting phononic structures to externally-induced spatio-temporal modulation of their elastic properties. Also presented is a new found analogy between a simple one-dimensional harmonic chain coupled to a rigid substrate subjected to a spatio-temporal modulation of the side spring stiffness and the Dirac equation in the presence of an electromagnetic field. The modulation is shown to be able to tune the spinor part of the elastic wave function and therefore its topology. This analogy between classical mechanics and quantum phenomena offers new modalities for developing more complex functions of phononic crystals and acoustic metamaterials.

A new frontier in wave propagation involves media that have broken time-reversal symmetry associated with non-conventional topology. Topological electronic, electromagnetic, and phononic crystals all have demonstrated unusual topologically constrained properties. There exist two-classes of phonon structures possessing non-conventional topology, namely intrinsic and extrinsic systems. Time-reversal symmetry in intrinsic systems is broken through internal resonance or symmetry breaking structural features (e.g. chirality) and without addition of energy from the outside. Energy is added to extrinsic topological systems to break time reversal symmetry. A common example of an extrinsic approach is that of time-reversal symmetry breaking of acoustic waves by moving fluids. Recently, extrinsic topological phononic crystals have demonstrated the astonishing property of non-reciprocity and backscattering-immune edge states and bulk states establishing classical equivalents of topological electronic insulators. The non-conventional topology of elastic waves in an intrinsic topological phononic structure has been associated with the notion of duality in the quantum statistics of phonons (i.e., boson vs. fermion).

The various embodiments disclosed are directed to methods for modeling the topological properties of elastic waves in the two classes of topological phononic structures, turning first to spinorial characteristics of elastic waves in crystals composed of connected masses and springs. An externally applied spatio-temporal modulation of the spring striffness can also be employed to break the symmetry of the system further. The modulation is able to tune the spinor part of the elastic wave function and therefore its topology. In addition to the mass spring systems discussed below, other physical systems that support elastic waves that can be described by Klein-Gordon-like equations include plates and phononic crystal plates, phononic crystals which support rotational elastic waves, granular phononic materials, elastic and sound wave guides with slowly varying cross sectional area.

Modeling of Intrinsic Topological Phononic Structures

FIG. 1 depicts a schematic illustration of a system 100 comprising two coupled one-dimensional harmonic crystals. The atoms 102A-C in the lower 1-D harmonic crystal 110 and the atoms 101A-C in the upper 1-D harmonic crystal 120 have mass m and M, respectively. The force constant of the upper 1-D harmonic crystal springs 103A-D and the lower 1-D harmonic crystal springs 104A-D is taken to be the same, $K_0$. The force constant of the coupling springs 105A-C is $K_1$. The periodicity of the crystal is a.

In absence of external forces, the equations describing the motion of atoms 102A-C of harmonic crystal 110, denoted in the equation below by subscript "n," and the of the atoms 101A-C of harmonic crystal 120, denoted in the equation below by subscript "m," are given by:

$$m\frac{\partial^2 u_n}{\partial t^2} = K_0(u_{n+1} - 2u_n + u_{n-1}) + K_1(v_n - u_n) = 0 \quad (1a)$$

$$M\frac{\partial^2 v_n}{\partial t^2} = K_0(v_{n+1} - 2v_n + v_{n-1}) - K_1(v_n - u_n) = 0 \quad (1b)$$

In the long wavelength limit the discrete Lagrangian is expressed as a continuous second derivative of position. Taking M=m for the sake of simplicity and mathematical tractability, the equations of motion (1a,b) can be rewritten as:

$$\left\{\left(\frac{\partial^2}{\partial t^2} - \beta^2 \frac{\partial^2}{\partial x^2}\right)I + \alpha^2 D\right\} U = 0 \quad (2)$$

where I is the 2×2 identity matrix, $$D = \begin{pmatrix} 1 & -1 \\ -1 & 1 \end{pmatrix}, U = \begin{pmatrix} u \\ v \end{pmatrix}$$

is the displacement vector, $$\alpha^2 = \frac{K_1}{m} \text{ and } \beta^2 = \frac{K_0}{m}.$$

Equation (2) takes a form similar to the Klein-Gordon equation. Using an approach paralleling that of Dirac, equation (2) can be factored into the following form:

$$\left(\left[A\frac{\partial}{\partial t} + \beta B\frac{\partial}{\partial x}\right] - i\frac{\alpha}{\sqrt{2}}C\right)\left(\left[A\frac{\partial}{\partial t} + \beta B\frac{\partial}{\partial x}\right] + i\frac{\alpha}{\sqrt{2}}C\right)\Psi = 0 \quad (3)$$

Eq. (3) introduces the 4×4 matrices:

$$A = \begin{pmatrix} 0 & 0 & 1 & 0 \\ 0 & 0 & 0 & 1 \\ 1 & 0 & 0 & 0 \\ 0 & 1 & 0 & 0 \end{pmatrix}, B = \begin{pmatrix} 0 & 0 & 0 & 1 \\ 0 & 0 & 1 & 0 \\ 0 & -1 & 0 & 0 \\ -1 & 0 & 0 & 0 \end{pmatrix}, C = \begin{pmatrix} 1 & -1 & 0 & 0 \\ -1 & 1 & 0 & 0 \\ 0 & 0 & 1 & -1 \\ 0 & 0 & -1 & 1 \end{pmatrix}.$$

The wave functions $$\Psi = \begin{pmatrix} \psi_1 \\ \psi_2 \\ \psi_3 \\ \psi_4 \end{pmatrix} \text{ and } \overline{\Psi} = \begin{pmatrix} \overline{\psi}_1 \\ \overline{\psi}_2 \\ \overline{\psi}_3 \\ \overline{\psi}_4 \end{pmatrix}$$

are 4 vector solutions of $$\left(\left[A\frac{\partial}{\partial t} + \beta B\frac{\partial}{\partial x}\right] - i\frac{\alpha}{\sqrt{2}}C\right)\Psi = 0 \text{ and }$$

$$\left(\left[A\frac{\partial}{\partial t} + \beta B\frac{\partial}{\partial x}\right] + i\frac{\alpha}{\sqrt{2}}C\right)\overline{\Psi} = 0,$$

respectively. $\Psi$ and $\overline{\Psi}$ are non-self dual solutions. These equations do not satisfy time reversal symmetry (t→−t), T-symmetry, nor parity symmetry (x→−x) separately. In the language of Quantum Field Theory, $\Psi$ and $\overline{\Psi}$ represent "particles" and "anti-particles".

Seeking solutions of $$\left(\left[A\frac{\partial}{\partial t} + \beta B\frac{\partial}{\partial x}\right] - i\frac{\alpha}{\sqrt{2}}C\right)\Psi = 0$$

in the plane wave form: $\psi_i = \alpha_i e^{ikx} e^{i\omega t}$ with i=1, 2, 3, 4 gives the Eigen value problem:

$$\begin{cases} -\delta a_1 + \delta a_2 + \omega a_3 + \beta k a_4 = 0 \\ \delta a_1 - \delta a_2 + \beta k a_3 + \omega a_4 = 0 \\ \omega a_1 - \beta k a_2 - \delta a_3 + \delta a_4 = 0 \\ -\beta k a_1 + \omega a_2 + \delta a_3 - \delta a_4 = 0 \end{cases} \quad (4)$$

where $$\delta = \frac{\alpha}{\sqrt{2}}.$$

Associated are two dispersion relations: $\omega = \pm \beta k$ and $\omega = \pm\sqrt{(\beta k)^2 + 2\alpha^2}$. The first set of dispersion relations corresponds to branches that start at the origin k=0 and relates to symmetric Eigen modes. The second set of branches represents anti-symmetric modes with a cut off frequency at k=0 of $\alpha\sqrt{2}$. Assuming that $\alpha_1 = \alpha_2 = \alpha_F$ and that $\alpha_3 = \alpha_4 = \alpha_B$, for the symmetric waves characterized by the first set of dispersion relations, then the equations (4) reduce to $(\omega + \beta k)\alpha_B = 0$ and $(\omega - \beta k)\alpha_B = 0$ which are satisfied by plane waves of arbitrary amplitudes, $\alpha_F$ and $\alpha_B$, propagating in the forward (F) or backward (B) directions, respectively. This is the conventional character of Boson-like phonons.

Turning to the Eigenvectors that correspond to the second set of dispersion relations, and using the positive Eigen value as an illustrative example: $\omega = +\sqrt{(\beta k)^2 + 2\alpha^2}$, one of the degenerate solutions of the system of four linear equations (4) is:

$$\begin{pmatrix} a_1 \\ a_2 \\ a_3 \\ a_4 \end{pmatrix} = a_0 \begin{pmatrix} \sqrt{\omega - \beta k} \\ -\sqrt{\omega - \beta k} \\ \sqrt{\omega + \beta k} \\ -\sqrt{\omega + \beta k} \end{pmatrix} \quad (5)$$

where $\alpha_0$ is some arbitrary constant and the negative signs reflect the anti-symmetry of the displacement. Other solutions can be found by considering the complete set of plane wave solutions $\psi_i = \alpha_i e^{\pm ikx} e^{\pm i\omega t}$ with i=1, 2, 3, 4 as well as the negative frequency Eigenvalue. The key result is that the second dispersion curve in the band structure is associated with a wave function whose amplitude shows spinorial character (Eq. 5). In this case, the displacement of the two coupled harmonic chains are constrained and the direction of propagation of waves in the two-chain system not independent of each other. For instance, at k~0, the anti-symmetric mode is represented by a wave which enforces a strict relation between the amplitude of a forward propagating wave and a backward propagating wave. This characteristic is representative of Fermion-like behavior of phonons. As Again, note that the band structure has two branches corresponding to positive frequencies and negative frequencies. Negative frequencies can be visualized as representing waves that propagate in a direction opposite to that of waves with positive frequency. Two by one spinor solutions of equations (6a) and (6b) for the different plane wave forms are summarized in the table below.

| | $e^{+ikx}e^{+i\omega_k t}$ | $e^{-ikx}e^{+i\omega_k t}$ | $e^{+ikx}e^{-i\omega_k t}$ | $e^{-ikx}e^{-i\omega_k t}$ |
|---|---|---|---|---|
| $\xi_k$ | $\begin{pmatrix} \sqrt{\omega+\beta k} \\ \sqrt{\omega-\beta k} \end{pmatrix}$ | $\begin{pmatrix} \sqrt{\omega-\beta k} \\ \sqrt{\omega+\beta k} \end{pmatrix}$ | $\begin{pmatrix} -\sqrt{\omega-\beta k} \\ \sqrt{\omega+\beta k} \end{pmatrix}$ | $\begin{pmatrix} -\sqrt{\omega+\beta k} \\ \sqrt{\omega-\beta k} \end{pmatrix}$ |
| $\bar{\xi}_k$ | $\begin{pmatrix} \sqrt{\omega-\beta k} \\ -\sqrt{\omega+\beta k} \end{pmatrix}$ | $\begin{pmatrix} \sqrt{\omega+\beta k} \\ -\sqrt{\omega-\beta k} \end{pmatrix}$ | $\begin{pmatrix} \sqrt{\omega+\beta k} \\ \sqrt{\omega-\beta k} \end{pmatrix}$ | $\begin{pmatrix} \sqrt{\omega-\beta k} \\ \sqrt{\omega+\beta k} \end{pmatrix}$ |

Figure 2:
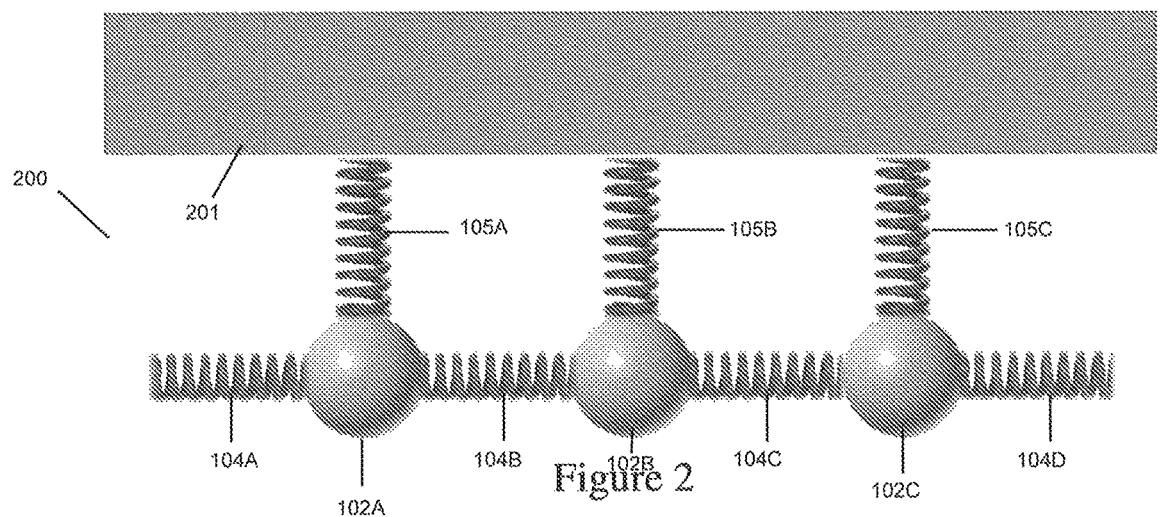
FIG. 2 depicts a schematic illustration of the system of FIG. 1 in the limit M→∞, in which case the system of FIG. 1 becomes a single harmonic chain grounded to a substrate.

$k \to \infty$, $w \to +\beta k$, the first two terms in equation (5) go to zero and only one direction of propagation (backward) is supported by the medium (third and terms in Eq 5). This example illustrates the difference in topology of elastic waves corresponding to the lower and upper bands in the band structure of the two-chain system. The constraint on the amplitude of waves in the upper band imparts a non-conventional spinorial topology to the Eigen modes which does exist for modes in the lower band. The topology of the upper band can be best visualized by taking the limit $M \to \infty$. In that case, the system of FIG. 1 becomes a single harmonic chain grounded to a substrate 201, as illustrated in FIG. 2.

In that limit, the displacement v in equations 1(a,b) is negligible. Equation (2) becomes the Klein-Gordon equation:

$$\frac{\partial^2 u}{\partial t^2} - \beta^2 \frac{\partial^2 u}{\partial x^2} + \alpha^2 u = 0$$

with $\alpha^2 = K_1/m$ and $\beta^2 = K_0/m$. This equation describes only the displacement field, u. Equation (3) can be written as the set of Dirac-like equations:

$$\left[\sigma_x \frac{\partial}{\partial t} + i\beta\sigma_y \frac{\partial}{\partial x} - i\alpha I\right]\Psi = 0 \quad (6a)$$

$$\left[\sigma_x \frac{\partial}{\partial t} + i\beta\sigma_y \frac{\partial}{\partial x} + i\alpha I\right]\bar{\Psi} = 0 \quad (6b)$$

where $\sigma_x$ and $\sigma_y$ are the 2×2 Pauli matrices:

$$\begin{pmatrix} 0 & 1 \\ 1 & 0 \end{pmatrix} \text{ and } \begin{pmatrix} 0 & -i \\ i & 0 \end{pmatrix}$$

and I is the 2×2 identity matrix.

Rewriting the solutions yields the form: $\Psi_k = \Psi(k, \omega_k) = c_0 \xi_k(k, \omega_k) e^{(\pm)i\omega_k t} e^{(\pm)ikx}$ and $\bar{\Psi}_k = \bar{\Psi}(k, \omega_k) = c_0 \bar{\xi}_k(k, \omega_k) e^{(\pm)i\omega_k t} e^{(\pm)ikx}$ where $\xi_k$ and $\bar{\xi}_k$ are two by one spinors. Inserting the various forms for these solutions in equations (6a,b) lead to the same Eigenvalues that were obtained for the upper band of the two-chain system, namely by to $\omega = \pm\sqrt{\alpha^2 + \beta^2 k^2}$.

This table can be used to identify the symmetry properties of $\Psi$ and $\bar{\Psi}$ in the allowed space: k, ω, and leads to the following transformation rules:

$$T_{\substack{\omega \to \omega \\ k \to -k}}(\Psi(\omega, k)) = \Psi(\omega, k) \quad (7a)$$

$$T_{\substack{\omega \to -\omega \\ k \to k}}(\Psi(\omega, k)) = i\sigma_x \bar{\Psi}(-\omega, k) \quad (7b)$$

which lead to the combined transformation:

$$T_{\substack{\omega \to -\omega \\ k \to -k}}(\Psi(\omega, k)) = i\sigma_x \bar{\Psi}(-\omega, -k) \quad (8)$$

$T_{\substack{\omega \to \omega \\ k \to -k}}$ and $T_{\substack{\omega \to -\omega \\ k \to k}}$ are defined as transformations that change the sign of the frequency and wave number, respectively. As one crosses the gap at the origin k=0, the multiplicative factor "i" indicates that the wave function accumulated a phase of $$\frac{\pi}{2}.$$

The Pauli operator $\sigma_x$ enables the transition from the space of solutions $\Psi$ to the space of $\bar{\Psi}$, and the orthogonality condition is $\Psi\sigma_x\bar{\Psi}=0$.

Figure 3:
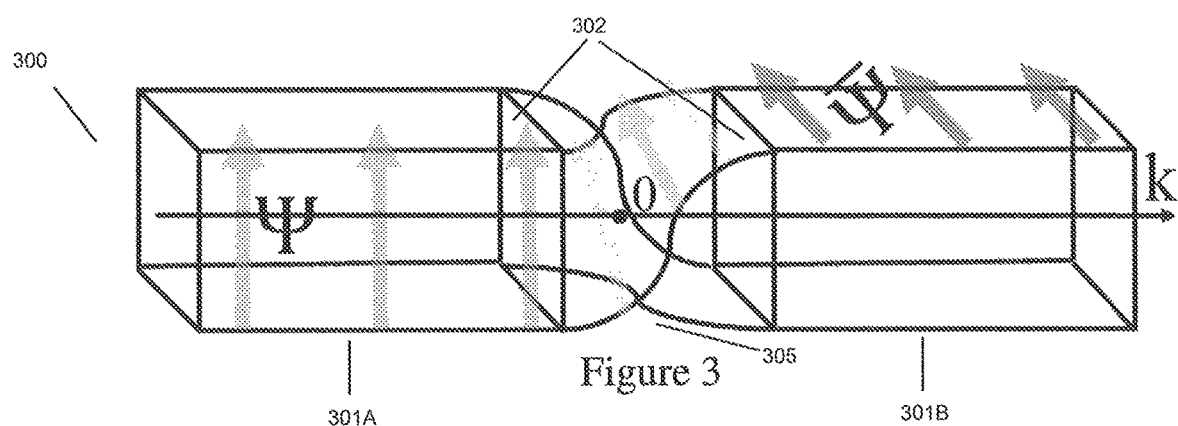
FIG. 3 depicts a schematic representation of the manifold supporting $\Psi$ and $\bar{\Psi}$, illustrating the topology of the spinorial wave function and associated symmetry properties.

The topology of the spinorial wave functions that reflects their symmetry properties is illustrated in FIG. 3, a schematic representation of a manifold 300 supporting wave functions $\Psi$ and $\bar{\Psi}$. The manifold 300 exhibits a local quarter-turn twist 305 around a 0 point along axis k or, in other words, at k=0. Square cross section 302 of the manifold reflects the orthogonality of $\Psi$ and $\bar{\Psi}$. Colored arrows are parallel transported on the manifold along the direction of wave number. Their change in orientation is indicative of the phase change.

Treating α in equations 6(a,b) as a perturbation, ε, provides further information relating to the properties of the spinorial solutions. When α=0, equation 6(a) reduces to the two independent equations:

$$\left(\frac{\partial}{\partial t} - \beta\frac{\partial}{\partial x}\right)\varphi_1^{(0)} = 0 \qquad (9a)$$

$$\left(\frac{\partial}{\partial t} + \beta\frac{\partial}{\partial x}\right)\varphi_2^{(0)} = 0 \qquad (9b)$$

whose solutions correspond to plane waves propagating in the forward direction, $\psi_1^{(0)}$, with dispersion relation $\omega^+ = \beta k$ and the backward direction, $\psi_2^{(0)}$ with dispersion relation $\omega^- = \beta k$. Rewriting equations (9) yields the form:

$$\left(\frac{\partial}{\partial t} - \beta\frac{\partial}{\partial x}\right)\varphi_1 = i\varepsilon\varphi_2^{(0)} = i\varepsilon e^{ikx}e^{\omega^- t} \qquad (10a)$$

$$\left(\frac{\partial}{\partial t} + \beta\frac{\partial}{\partial x}\right)\varphi_2 = i\varepsilon\varphi_1^{(0)} = i\varepsilon e^{ikx}e^{\omega^+ t} \qquad (10b)$$

Solving for the particular solutions to first-order, $\psi_1^{(1)}$ and $\psi_2^{(1)}$, which follow in frequency the driving terms on the right-side of equations (10a, b), yields their respective amplitudes:

$$a_1 = \frac{\varepsilon}{\omega^- - \beta k} = \frac{\varepsilon}{\omega^- - \omega^+} \qquad (11a)$$

$$a_2 = \frac{\varepsilon}{\omega^+ + \beta k} = \frac{\varepsilon}{\omega^+ - \omega^-} = -a_1 \qquad (11b)$$

Since $\omega^+ = \omega^-$ at $k=0$ only, the amplitude of the first-order perturbed forward wave, $\alpha_1$, changes sign as k varies from $-\infty$ to $+\infty$. A similar but opposite change of sign occurs for the backward perturbed amplitude. These changes of sign are therefore associated with changes in phase of $\pi$ and $-\pi$ for the forward and backward waves as one crosses the origin $k=0$. These phase changes (sign changes) are characteristic of that occurring at a resonance. The gap that would occur at $k=0$ in the band structure of the harmonic chain grounded to a substrate via side springs, should the perturbation theory be pushed to higher orders, may therefore be visualized as resulting from a resonance of forward waves driven by the backward propagating waves and vice versa. However, since to first-order the amplitudes given by equations (11a,b) diverge at the only point of intersection between the dispersion relations of the forward and backward waves, analytic continuation may be used to expand them into the complex plane:

$$a_1^+ = \frac{\varepsilon}{\omega^- - \beta k - i\eta} = \frac{\varepsilon}{-2\beta k - i\eta} \qquad (12a)$$

$$a_2^+ = \frac{\varepsilon}{\omega^+ + \beta k + i\eta} = \frac{\varepsilon}{+2\beta k + i\eta} \qquad (12b)$$

where $\eta \to 0$ continues the Eigen values $\omega^-$ and $\omega^+$ into the complex plane.

At the origin, $k=0$, both amplitudes are pure imaginary quantities and therefore exhibit a phase of $\pm$ $$\pm\frac{\pi}{2}.$$

This is expected as equations (12a,b) are representative of the amplitude of a driven damped harmonic oscillator, which also shows a phase of $$\frac{\pi}{2}$$

with respect to the driving frequency at resonance. It is instructive to calculate the Berry connection for these perturbed amplitudes. The Berry connection determines the phase change of a wave as some parameter takes the wave function along a continuous path on the manifold that supports it. Since the Berry phase applies to continuous paths, it cannot be used to determine the phase change across the gap of the presently discussed system i.e. between the positive and negative frequency branches of the band structure. Therefore, the Berry connection is instead calculated for the first-order perturbed solution which still remains continuous but may capture the interaction between directions of propagation, with the intention of characterizing the topology of the spinorial part the wave function (Eq. 12a,b), by calculating the change in phase of the waves as one crosses $k=0$.

It is important first to normalize the spinor:

$$\xi = \begin{pmatrix} a_1^+ \\ a_2^+ \end{pmatrix}.$$

This normalized spinor takes the form $$\tilde{\xi} = \begin{pmatrix} \tilde{a}_1^+ \\ \tilde{a}_2^+ \end{pmatrix} = \frac{\sqrt{4\beta^2 k^2 + \eta^2}}{\sqrt{2}} \begin{pmatrix} \frac{1}{-2\beta k - i\eta} \\ \frac{1}{+2\beta k + i\eta} \end{pmatrix}.$$

The Berry connection is given by $$A(k) = -i\tilde{\xi}^* \frac{\partial \tilde{\xi}}{\partial k} = -i\tilde{a}_1^{+*} \frac{\partial \tilde{a}_1^+}{\partial k} - i\tilde{a}_2^{+*} \frac{\partial \tilde{a}_2^+}{\partial k}.$$

Several analytical and algebraic manipulations yield:

$$A(k) = \beta\frac{\eta}{4\beta^2 k^2 + \eta^2} + \beta\frac{\eta}{4\beta^2 k^2 + \eta^2} \qquad (13)$$

In Equation (13), the contribution to the Berry connection of $\tilde{\alpha}_1^+$ and $\tilde{\alpha}_2^+$ are identical. Using the identities:

$$\lim_{\eta\to\infty} \frac{\eta}{x^2 + \eta^2} = \pi\delta(x) \text{ and } \delta(ax) = \frac{1}{a}\delta(x),$$

leads to $$A(k) = \frac{\pi}{2}\delta(k) + \frac{\pi}{2}\delta(k) \qquad (14)$$

The contribution of each direction of propagation to the spinorial part of the wave function accumulates a $$\frac{\pi}{2}$$

phase shift as one crosses the origin k=0.

Model of Extrinsic Phononic Structures

For intrinsic phononic structures, the spinorial character of the elastic wave function in the two-chain system and one chain coupled to the ground are known, per the discussion above. Still unknown is the behavior of field $\Psi$ when the parameter $\alpha$ (spring stiffness, $K_0$) is subjected to a spatio-temporal modulation, i.e. $\alpha=\alpha_0+\alpha_1 2\sin(Kx+\Omega t)$ where $\alpha_0$ and $\alpha_1$ are constants. Here, $$K = \frac{2\pi}{L}$$

where L is the period of the modulation. $\Omega$ is the frequency modulation and its sign determines the direction of propagation of the modulation. The question arises as to the effect of such a modulation on the state of the fermion-like phonons. The periodicity of the modulated one-dimensional medium suggests solving for solutions of equation (1) in the form of Bloch waves: $\Psi(x,t)=\Sigma_k \Sigma_g \psi(k,g,t)e^{i(k+g)x}$ where $\chi \in [0, L]$. The wave number k is limited to the first Brillouin zone:

$$\left[\frac{-\pi}{L}, \frac{\pi}{L}\right] \text{ and } g = \frac{2\pi}{L}l$$

with l being an integer. Choosing equation (6a) yields the modulated Dirac-like equation in the Fourier domain:

$$\left[\sigma_x \frac{\partial}{\partial t} + i\beta\sigma_y(ik^*) - i\alpha_0 I\right]\psi(k^*, t) - \alpha_1 I\left[\psi(k^* + K, t)e^{i\Omega t} - \psi(k^* - K, t)e^{-i\Omega t}\right] = 0 \quad (15)$$

where k*=k+g.

Consistent with QFT approaches, equation (15) is solved using perturbation theory and in particular multiple time scale perturbation theory up to second-order. The parameter $\alpha_1$ is treated as a perturbation $\varepsilon$. The wave function is written as a second-order power series in $\varepsilon$, namely:

$$\psi(k^*,\tau_0,\tau_1,\tau_2)=\psi^{(0)}(k^*,\tau_0,\tau_1,\tau_2)+\varepsilon\psi^{(1)}(k^*,\tau_0,\tau_1,\tau_2)+\varepsilon^2\psi^{(2)}(k^*,\tau_0,\tau_1,\tau_2).$$

Here $\psi^i$ with i=0,1,2 are wave functions expressed to zeroth, first and second-order. The single time variable, t, is replaced by three variables representing different time scales: $\tau_0=t$, $\tau_1=\varepsilon t$, and $\tau_2=\varepsilon^2 t=\varepsilon^2\tau_0$. Equation (15) can subsequently be decomposed into equations to zeroth, first and second order in $\varepsilon$. The zeroth-order equation may include the Dirac-like equation in absence of modulation:

$$\left[\sigma_x \frac{\partial}{\partial \tau_0} + i\beta\sigma_y(ik^*) - i\alpha_0 I\right]\psi^{(0)}(k^*, \tau_0, \tau_1, \tau_2) = 0 \quad (16)$$

As discussed previously, its solutions take the form $$\psi^{(0)}(k^*, \tau_0, \tau_1, \tau_2) = \begin{pmatrix} a_1^{(0)} \\ a_2^{(0)} \end{pmatrix} = a_0 \begin{pmatrix} \sqrt{\omega_0 + \beta k^*} \\ \sqrt{\omega_0 - \beta k^*} \end{pmatrix}.$$

$e^{i\omega_0 \tau_0}$ and $\alpha^{(0)}$ represent the orbital and the spinorial parts of the solution, respectively, once again using the usual Eigen values: $\omega_0^2 = \alpha^2 + \beta^2(k^*)^2$. Inserting the zeroth-order solution into equation (15) expressed to first-order leads to secular terms that can be eliminated by assuming that the wave functions at all order are independent of $\tau_1$.

This equation takes the form:

$$\left[\sigma_x \frac{\partial}{\partial \tau_0} + i\beta\sigma_y(ik^*) + i\alpha_0 I\right]\psi^{(1)}(k^*, \tau_0, \tau_2) = I\left[\psi^{(0)}(k^* + K, \tau_0, \tau_2)e^{i\Omega\tau_0} - \psi^{(0)}(k^* - K, \tau_0, \tau_2)e^{-i\Omega\tau_0}\right] \quad (17)$$

The solutions of the first-order Dirac equation are the sum of solutions of the homogeneous equation and particular solutions. The homogenous solution is isomorphic to the zeroth-order solution, it will be corrected in a way similar to the zeroth-order solution as one accounts for higher and higher terms in the perturbation series. The particular solution contains frequency shifted terms given by:

$$\psi_{1,P}^{(1)} = b_1 e^{i(\omega_0+\Omega)\tau_0} + b_1' e^{i(\omega_0-\Omega)\tau_0}$$

$$\psi_{2,P}^{(1)} = b_2 e^{i(\omega_0+\Omega)\tau_0} + b_2' e^{i(\omega_0-\Omega)\tau_0}$$

The coefficients $b_1$, $b_1'$, $b_2$, $b_2'$ are resonant terms:

$$b_1(k^*) = \frac{i}{\alpha_0}a_1^{(0)}(k^* + K) + \frac{1}{\alpha_0}b_2(k^*)[(\omega_0 + \Omega) + \beta k^*]$$

$$b_1'(k^*) = \frac{-i}{\alpha_0}a_1^{(0)}(k^* - K) + \frac{1}{\alpha_0}b_2'(k^*)[(\omega_0 - \Omega) + \beta k^*]$$

$$b_2(k^*) = -i\frac{\{a_1^{(0)}(k^* + K)[(\omega_0 + \Omega) - \beta k^*] + \alpha_0 a_2^{(0)}(k^* + K)\}}{(\omega_0 + \Omega)^2 - (\beta k^*)^2 - \alpha_0^2}$$

$$b_2'(k^*) = +i\frac{\{a_1^{(0)}(k^* - K)[(\omega_0 - \Omega) - \beta k^*] + \alpha_0 a_2^{(0)}(k^* - K)\}}{(\omega_0 - \Omega)^2 - (\beta k^*)^2 - \alpha_0^2}$$

The preceding relation make use of the definition: $\omega_0 + \Omega = \omega_0(k^*+K) + \Omega$ and $\omega_0 - \Omega = \omega_0(k^*-K) + \Omega$, with the time dependencies omitted for the sake of compactness.

To order of $\varepsilon^2$ the Dirac-like equation is written as:

$$\left[\sigma_x \frac{\partial}{\partial \tau_0} + i\beta\sigma_y(ik^*) - i\alpha_0 I\right]\psi^{(2)}(k^*, \tau_0, \tau_2) = -\sigma_x \frac{\partial \psi^{(0)}(k^*, \tau_0, \tau_2)}{\partial \tau_2} + I\left[\psi^{(1)}(k^* + K, \tau_0, \tau_2)e^{i\Omega\tau_0} - \psi^{(1)}(k^* - K, \tau_0, \tau_2)e^{-i\Omega\tau_0}\right] \quad (18)$$

The derivative $$\frac{\partial \psi^{(0)}(k^*, \tau_0, \tau_2)}{\partial \tau_2}$$

leads to secular terms. The homogeneous part of the first-order solution does not contribute secular terms but the particular solution does. Combining all secular terms and setting them to zero leads to the conditions:

$$\frac{\partial a_1^{(0)}(k^*)}{\partial \tau_2} = ia_1^{(0)}(k^*)G' + ia_2^{(0)}k^*F \quad (19a)$$

$$\frac{\partial a_2^{(0)}(k^*)}{\partial \tau_2} = ia_1^{(0)}(k^*)F + ia_2^{(0)}(k^*)G \quad (19b)$$

with the definitions:

$$F = \alpha_0 \left\{ \frac{1}{(\omega_0(k^*) - \Omega)^2 - \omega_0^2(k^* + K)} + \frac{1}{(\omega_0(k^*) + \Omega)^2 - \omega_0^2(k^* - K)} \right\}$$

$$G = \left\{ \frac{(\omega_0(k^*) - \Omega) + \beta(k^* + K)}{(\omega_0(k^*) - \Omega)^2 - \omega_0^2(k^* + K)} + \frac{(\omega_0(k^*) + \Omega) + \beta(k^* - K)}{(\omega_0(k^*) + \Omega)^2 - \omega_0^2(k^* - K)} \right\}$$

$$G' = \left\{ \frac{(\omega_0(k^*) - \Omega) - \beta(k^* + K)}{(\omega_0(k^*) - \Omega)^2 - \omega_0^2(k^* + K)} + \frac{(\omega_0(k^*) + \Omega) - \beta(k^* - K)}{(\omega_0(k^*) + \Omega)^2 - \omega_0^2(k^* - K)} \right\}$$

Notably, these quantities are asymmetric. The terms G, G' and F diverge within the Brillouin zone of the modulated systems when the condition $(\omega_0(k^*)+\Omega)^2 - \omega_0^2(k^*-K) \to 0$ is satisfied but not when $(\omega_0(k^*)+\Omega)^2 - \omega_0^2(k^*+K) \to 0$. This asymmetry reflects a breaking of symmetry in wave number space due to the directionality of the modulation.

Equations (19a,b) impose second-order corrections onto the zeroth-order solution. Multiplying the relations (18a,b) by $\varepsilon^2 e^{i\omega_0 \tau_0}$ translates them into terms of $\psi^{(0)}$ at which point they may be subsequently recombined with the zeroth-order equation (3). This procedure reconstructs the perturbative series of equation (15) in terms of $\psi^{(0)}$ only:

$$\left[ \sigma_x \left( \frac{\partial}{\partial t} - i\phi_{k^*} \right) + i\beta \sigma_y (ik^* - iA_{k^*}) - i(\alpha_0 + m_{k^*})I \right] \psi^{(0)}(k^*, t) = 0 \quad (20)$$

with $$\begin{pmatrix} \phi_{k^*} \\ A_{k^*} \end{pmatrix} = \begin{pmatrix} \frac{\varepsilon^2}{2}(G + G') \\ \frac{\varepsilon^2}{2\beta}(G - G') \end{pmatrix}$$

and $m_{k^*} = \varepsilon^2$, and further making use of the relation $$\frac{\partial}{\partial t} = \frac{\partial}{\partial \tau_0} + \varepsilon^2 \frac{\partial}{\partial \tau_2}.$$

Equation (20) shows that equation (15) describing the dynamics of elastic waves in a harmonic chain grounded to a substrate via side springs, whose stiffness is modulated in space and time, is second-order isomorphic to Dirac equation in Fourier domain for a charged quasiparticle including an electromagnetic field. The quantity $\phi_{k^*}$ plays the role of the electrostatic potential and $A_{k^*}$ the role of a scalar form of the vector potential. The parentheses $$\left( \frac{\partial}{\partial t} - i\phi_{k^*} \right)$$

and $(ik^* - iA_{k^*})$ are the Fourier transforms of the usual minimal substitution rule. $\alpha_0 + m_{k^*}$ is the dressed mass of the quasiparticle. The mechanical system provides a mechanism for exchange of energy between the main chain modes and the side springs. The side springs lead to the formation of a fermion-like quasiparticle while their modulation provides a field through which quasiparticles interact. The strength and nature of the interaction is controllable through the independent modulation parameters, $\alpha_0$, $\Omega$, and K.

The mechanical system allows for the exploration of a large parameter space of scalar QFT as the functions $\phi_{k^*}$ and $A_{k^*}$ can be varied by manipulating the spatio-temporal modulation of the side spring stiffness. It is likely, therefore, that this classical phononic system can be employed to examine the behavior of scalar QFT from weak to strong coupling regimes, as well as at all intermediate couplings. Further, the capacity to separate the ratio of the effective potentials opens venues for the experimental realization of scalar fields whose behavior could previously only have been theorized.

Returning to equation (20), its solutions are solutions of equation (18) with spinorial part $\alpha^{(0)}(k^*, \tau_2)$ satisfying the second-order conditions given by equations (19a,b). These conditions can be reformulated as $$\frac{\partial \tilde{a}}{\partial \tau_2} = iM\tilde{a}$$

where the vector $$\tilde{a} = \begin{pmatrix} a_1^{(0)} \\ a_2^{(0)} \end{pmatrix}$$

and the matrix $$M = \begin{pmatrix} G' & F \\ F & G \end{pmatrix}.$$

Solutions of this 2×2 system of first-order linear equations are easily obtained as: $\tilde{a} = C\tilde{e}e^{i\lambda \tau_2} + C'\tilde{e}'e^{i\lambda' \tau_2}$ where $\lambda$, $\tilde{e}$, and $\tilde{e}'$ are the Eigen values and Eigen vectors of the matrix M. The coefficients C and C' are determined by the boundary condition:

$$\lim_{k \to 0} \tilde{a} = a_0 \begin{pmatrix} \sqrt{\omega_0 + \beta k^*} \\ \sqrt{\omega_0 - \beta k^*} \end{pmatrix}.$$

The Eigen values $$\lambda = \frac{G + G'}{2} + \sqrt{\left(\frac{G - G'}{2}\right)^2 + F^2} \text{ and } \lambda = \frac{G + G'}{2} - \sqrt{\left(\frac{G - G'}{2}\right)^2 + F^2}$$

are then found. The respective Eigen vectors are $$\tilde{e} = a_0 \sqrt{\omega_0(k^*) = \beta k^* F} \left( \frac{G - G'}{2F} + \frac{1}{\sqrt{\left(\frac{G-G'}{2F}\right)^2 + 1}} \right) \text{ and}$$

$$\tilde{e} = a_0 \sqrt{\omega_0(k^*) = \beta k^* F} \left( \frac{G - G'}{2F} - \frac{1}{\sqrt{\left(\frac{G-G'}{2F}\right)^2 + 1}} \right).$$

The coefficients are given by $$C = \frac{1}{F} \frac{1}{2\sqrt{\left(\frac{G-G'}{2F}\right)^2 + 1}} \left\{ \frac{\omega_0(k^*) - \beta k^*}{\omega_0(k^*) + \beta k^*} - \frac{G - G'}{2F} + \sqrt{\left(\frac{G-G'}{2F}\right)^2 + 1} \right\}$$

and $$C' = \frac{1}{F} \frac{1}{2\sqrt{\left(\frac{G-G'}{2F}\right)^2 + 1}} \left\{ -\frac{\omega_0(k^*) - \beta k^*}{\omega_0(k^*) + \beta k^*} + \frac{G - G'}{2F} + \sqrt{\left(\frac{G-G'}{2F}\right)^2 + 1} \right\}.$$

Although the quantities G, G' and F may diverge, the ratio $$\frac{G - G'}{2F}$$

remains finite.

The directed spatio-temporal modulation impacts both the orbital part and the spinor part of the zeroth-order modes. The orbital part of the wave function is frequency shifted to $\omega_0 + \varepsilon^2 \lambda$ and $\omega_0 + \varepsilon^2 \lambda'$. The quantities $\varepsilon^2 \lambda t$ and $\varepsilon^2 \lambda' t$ represent phase shifts analogous to those associated with the Aharonov-Bohm effect resulting from electrostatic and vector potentials $\emptyset_{k^*}$ and $A_{k^*}$. Near the resonant condition, $(\omega_0(k^*)+\Omega)^2 - \omega_0^2(k^* - K) \rightarrow 0$, the Eigen value $$\lambda \rightarrow \frac{1}{(\omega_0(k^*) + \Omega) + \omega_0(k^* - K)} \sim \frac{1}{2(\omega_0(k^*) + \Omega)}$$

does not diverge. Since the frequency shift, $\varepsilon^2 \lambda'$, is expected to be small compared to $\omega_0(k^*)$, the orbital term $e^{i\lambda' \tau_2} \rightarrow 1$. Considering that the lowest frequency $\omega_0$ is $\alpha_0$, this condition would occur for all k*. Therefore, the term $e^{i(\omega_0+\varepsilon^2\lambda')\tau_0} \sim e^{i\omega_0 \tau_0}$ will essentially contribute to the band structure in a perturbative way similar to that of the uncorrected zeroth-order solution or homogeneous parts of the first or second-order equations. The spinorial part of the zeroth-order solution is also modified through the coupling between the orbital and "spin" part of the wave function as seen in the expressions for $\tilde{e}$ and $\tilde{e}'$. This coupling suggests an approach for the manipulation of the "spin" part of the elastic wave function by exciting the medium using a spatio-temporal modulation. Again, these alterations can be achieved by manipulating independently the magnitude of the modulation, $\alpha_1$ as well as the spatio-temporal characteristics $\omega$ and K.

The perturbative approach used here demonstrates the capacity of a spatio-temporal modulation to control the "spin-orbit" characteristics of elastic modes in a manner analogous to electromagnetic waves enabling the manipulation of the spin state of electrons. However, the pertubative method is not able to give a complete picture of the effect of the modulation on the entire band structure of the elastic modes. For this, the vibrational properties of the mechanical system are also investigated numerically beyond perturbation theory by calculating the phonon band structure of the modulated elastic Klein-Gordon equation, since its Eigen values are identical to those of the modulated Dirac-like equation. The present calculation uses a one-dimensional chain that contains N=2400 masses, m=4.361×10⁻⁹ kg, with Born-Von Karman boundary conditions. The masses are equally spaced by h=0.1 mm. The parameters $\kappa_1$=0.018363 kgm²s⁻² and $\kappa_2$=2.295 kgs⁻². The spatial modulation has a period L=100 h and an angular frequency $\Omega$=1.934×105 rad/s. Also chosen is the magnitude of the modulation:

$$\alpha_1 = \frac{1}{10}\alpha_0.$$

Figure 4:
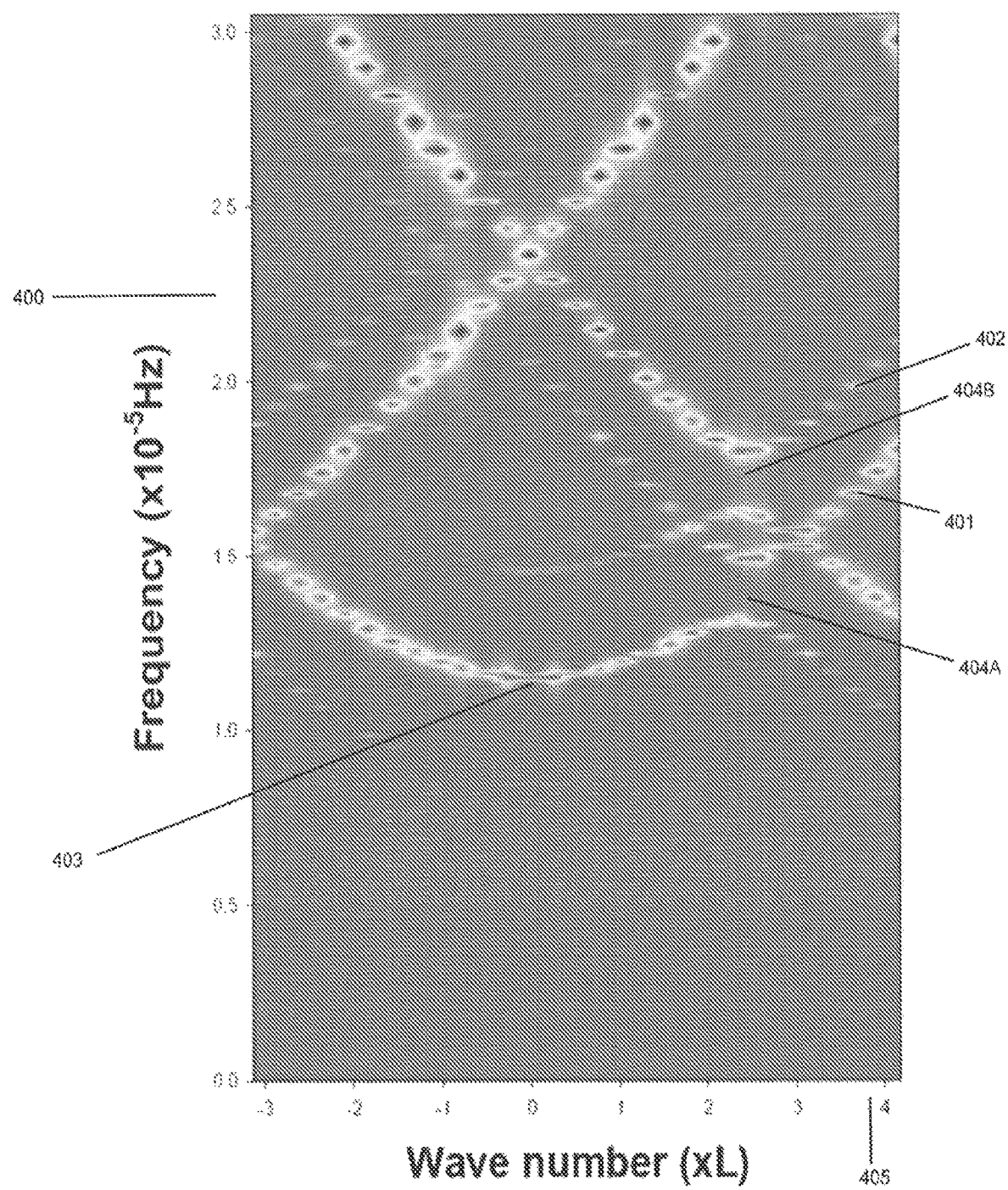
FIG. 4 depicts the band structure of the mechanical model system of FIG. 1 calculated using the Spectral Energy Density (SED) method.

The dynamics of the modulated system is amenable to the method of molecular dynamics (MD). The integration time step is dt=1.624×10⁻⁹ s. The dynamical trajectories generated by the MD simulation are analyzed within the framework of the Spectral Energy Density (SED) method for generating the band structure. To ensure adequate sampling of the system's phase-space the SED calculations are averaged over 4 individual MD simulations, each simulation lasting 2²⁰ time steps and starting from randomly generated initial conditions. FIG. 4 illustrates the calculated band structure of the modulated system.

More particularly, FIG. 4 depicts the band structure of the mechanical model system of FIG. 1 calculated using the Spectral Energy Density (SED) method. The band structure is reported as a contour plot 400 of the natural logarithm of the SED versus frequency and reduced wave number. The horizontal axis includes a range 405 to the right of the first Brillouin zone [−π, π] so as to highlight the asymmetry and therefore the modulation-induced symmetry breaking of the band structure. Brighter branches 401 correspond to the usual zeroth-order type wave ($e^{i\omega_0(k+g)\tau_0}$). Fainter branches 402 are parallel to the brighter branches 401 and are characteristic of first-order waves ($e^{i(\omega_0(k+g)\pm\Omega)\tau_0}$).

FIG. 4 retains the essential features of the unperturbed band structure but for frequency shifted Bloch modes $\omega_0(k^*) \pm \Omega$ and two band gaps 404A and 404B in the positive half of the Brillouin zone. The frequency shifted modes are illustrative of the first-order particular solutions. Second-order frequency shifted modes $\omega_0(k^*) \pm 2\Omega$ do not show in the figure due to their very weak amplitude. The two band gaps 404A and 404B occur at the wave vector $k_{gap}$ defined by the condition $(\omega_0(k_{gap}+g)+\Omega)^2 - \omega_0^2(k_{gap}+g-K)=0$ for g=0 and g=K. It is the band folding due to the spatial modulation which enables overlap and hybridization between the frequency-shifted Bloch modes and the original Bloch modes of the lattice without the time dependency of the spatial modulation. The hybridization opens gaps in a band structure that has lost its mirror symmetry about the origin of the Brillouin zone. Considering the first gap and following a path in k space, starting at k=0 at the bottom 403 of the lowest branch, the wave function transitions from a state corresponding to a zeroth-order type wave, with orbital part ($e^{i\omega_0(k)\tau_0}$) and spinor part $$\begin{pmatrix} \sqrt{\omega_0 + \beta k} \\ \sqrt{\omega_0 - \beta k} \end{pmatrix}$$

to a wave having the characteristics of the first-order wave with orbital part ($e^{i(\omega_0(k^*) - \Omega)\tau_0}$) and spinor part $$\begin{pmatrix} b'_1 \\ b'_2 \end{pmatrix}.$$

The control of the position of the gap through $\Omega$ and $K$ enables strategies for tuning the spinorial character of the elastic wave. The effect of these 'spin-orbit' manipulations of the elastic system can be measured by examining the transmission of plane waves as shown in FIG. 4.

It is also instructive to consider the symmetry of the Dirac-like equations in the presence of spatio-temporal modulation to best understand its effect on the spinorial character of the wave function. In the case of a modulation with a general phase $\psi$, equations (6a,b) take the overall form:

$$\left[\sigma_x \frac{\partial}{\partial t} + i\beta\sigma_y \frac{\partial}{\partial x} - i\alpha_0 I - i\alpha_1 \sin(Kx + \Omega t + \varphi)\right]\Psi = 0 \quad (21a)$$

$$\left[\sigma_x \frac{\partial}{\partial t} + i\beta\sigma_y \frac{\partial}{\partial x} + i\alpha_0 I + i\alpha_1 \sin(Kx + \Omega t + \varphi)\right]\overline{\Psi} = 0 \quad (21b)$$

Applying the joint T-symmetry and parity symmetry to equation (21a) does not result in equation (21b) for all phases $\psi$ but a few special values. The modulated Equations (21a,b) have lost the symmetry properties of the unmodulated Dirac equations (Eq. 6a,b). The gap that formed at $k_{gap}$ in FIG. 4 is therefore not a Dirac point. The transformations $$T_{\substack{\omega \to \omega \\ k \to -k}} \text{ and } T_{\substack{\omega \to -\omega \\ k \to k}}$$

do not apply near $k_{gap}$. The constraints imposed on the spinorial component of the elastic wave function may be released in the vicinity of that wavenumber. This constraint was associated with Fermion-like wave functions which have the character of quasistanding waves, i.e. composed of forward and backward waves with a very specific proportion of their respective amplitudes. The release of the Dirac constraint associated with the impossibility for the medium to support forward propagating waves ($+k_{gap}$) but only backward propagating waves ($-k_{gap}$), may lead again to Boson-like behavior with no restriction on the amplitude of the backward propagating waves.

CONCLUSION

As shown above, phononic structures can be modeled using two coupled one-dimensional harmonic chains and one harmonic chained grounded to a substrate that exhibit intrinsic non-conventional topology. This topology is associated with wave functions that possess spinorial and orbital components. The spinorial character of the wave function imparts a fermion-like character to the phonons. This behavior is reflected in a constraint on the amplitude of forward and backward going waves. Also presented is a scalar Quantum Field Theory that demonstrates a new analogy between the one-dimensional elastic system subjected to a spatio-temporal modulation of its elastic properties and the one-dimensional Dirac equation including an electromagnetic field. The directional spatio-temporal modulation enables the tuning of the spinorial and orbital components of the wave function. Since the spatio-temporal characteristics of the modulation are independent of each other they offer powerful means of controlling the spinor components of the elastic wave.

Practical physical realization of the modulation of elastic medium stiffness can be achieved by exploiting a variety of non-contact approaches including the photo-elastic effect, the magneto-elastic effect, and the piezoelectric effect. The analogy between classical mechanical systems such as the ones illustrated herein and quantum and electromagnetic phenomena offer a new modality for developing more complex functions of phononic crystals and acoustic metamaterials.

The invention claimed is:

1. A method for modeling quantum systems, the method comprising:
   providing an intrinsic phononic structure comprising mechanical components;
   factoring an elastic wave equation of motion of the instrinsic phononic structure into a Dirac-like equation;
   determining antisymmetric modes of the intrinsic phononic structure based at least in part on the Dirac-like equation, wherein the antisymmetric modes have spinorial character and impute a topology of the intrinsic phononic structure in wave number space; and
   applying a directed spatio-temporal modulation to the intrinsic phononic structure, wherein the modulation tunes the spinorial character of the wave equation thereby modifying the topology of the intrinsic phononic structure.

2. The method of claim 1, wherein the spinorial character of the wave function imparts a fermion-like character to phonons in the structure.

3. The method of claim 1, wherein the spinorial character is tuned by applying a constraint on the amplitude of forward and backward going waves.

4. The method of claim 1, wherein the intrinsic phononic structure comprising mechanical components further comprises phononic crystals supporting rotational waves.

5. The method of claim 4, wherein the phononic crystals comprise:
   a first harmonic crystal comprising a first series of three or more masses aligned along a first axis, the first series of three or more masses linked together by a first series of springs, wherein each spring is longitudinally aligned along the first axis and disposed between two adjacent masses of the first series of three or more masses;
   a second harmonic crystal comprising a second series of three or more masses aligned along a second axis, the second axis parallel to the first axis and the second series of three or more masses linked together by a second series of springs, wherein each spring of the second series of springs is longitudinally aligned along the second axis and disposed between two adjacent masses of the second series of three or more masses;
   a third series of springs, each spring longitudinally aligned perpendicular to the first axis and the second axis; and
   wherein each spring of the third series of springs couples a first mass of the first series of three or more masses to an associated second mass of the second series of three or more masses, thereby coupling the first harmonic crystal and the second harmonic crystal.

6. The method of claim 4, wherein a single phononic crystal is coupled to a rigid substrate, the single phononic crystal comprising:
- a series of three or more masses aligned along a first axis, the series of three or more masses linked together by a first series of springs, wherein each spring of the first series of springs is longitudinally aligned along the first axis and disposed between two adjacent masses of the series of three or more masses;
- wherein a second series of springs couples the phononic crystal to the rigid substrate, each spring of the second series of springs longitudinally aligned perpendicular to the first axis and each spring of the second series of springs couples a mass of the series of three or more masses to the rigid substrate; and
- wherein the rigid substrate is aligned generally parallel to the first axis.

7. The method of claim 1, wherein the directed spatio-temporal modulation is applied by exploiting the photo-elastic effect.

8. The method of claim 1, wherein the directed spatio-temporal modulation is applied by exploiting the magneto-elastic effect.

9. The method of claim 1, wherein the spatio-temporal modulation is applied by exploiting the piezoelectric effect.

10. An apparatus for modeling quantum systems, the apparatus comprising:
- a first harmonic chain comprising three or more connected masses linearly aligned along a first axis;
- a second harmonic chain comprising three or more connected masses linearly aligned along a second axis, the second axis aligned parallel to the first axis;
- wherein the first harmonic chain and the second harmonic chain are coupled and the coupled harmonic chains exhibit topologically constrained properties; and
- wherein the coupled chains display an elastic behavior in response to a spatio-temporal modulation of elastic properties of the coupled chains, the elastic behavior being isomorphic to quantum systems.

11. The apparatus of claim 10, wherein the spatio-temporal modulation is applied by exploiting the photo-elastic effect.

12. The apparatus of claim 10, wherein the spatio-temporal modulation is applied by exploiting the magneto-electric effect.

13. The apparatus of claim 10, wherein the spatio-temporal modulation is applied by exploiting the piezoelectric effect.

14. The apparatus of claim 10, wherein the coupled harmonic chains have a non-conventional topology.

15. An apparatus for modeling quantum systems, the apparatus comprising:
- a harmonic chain comprising three or more connected masses linearly aligned along a first axis;
- a rigid substrate aligned generally parallel to the first axis;
- wherein the harmonic chain and the rigid substrate are coupled and the coupled harmonic chains exhibit topologically constrained properties; and
- wherein the coupled chain and substrate displays an elastic behavior in response to spatio-temporal modulation of elastic properties of the coupled chain and substrate, the elastic behavior being isomorphic to quantum systems.

16. The apparatus of claim 14, wherein the spatio-temporal modulation is applied by exploiting the photo-elastic effect.

17. The apparatus of claim 14, wherein the spatio-temporal modulation is applied by exploiting the magneto-electric effect.

18. The apparatus of claim 14, wherein the spatio-temporal modulation is applied by exploiting the piezoelectric effect.

19. The apparatus of claim 14, wherein the coupled harmonic chains have a non-conventional topology.

20. The apparatus of claim 14, wherein the quantum systems are describable by a Dirac equation.

* * * * *